United States Patent
Tillotson et al.

(10) Patent No.: US 7,739,048 B2
(45) Date of Patent: Jun. 15, 2010

(54) METHOD AND SYSTEM FOR DETERMINING WATER VAPOR PROFILE USING GPS SIGNALS

(75) Inventors: Brian J. Tillotson, Kent, WA (US); Tamaira E. Ross, Seattle, WA (US)

(73) Assignee: The Boeing Company, Chicago, IL (US)

(*) Notice: Subject to any disclaimer, the term of this patent is extended or adjusted under 35 U.S.C. 154(b) by 3 days.

(21) Appl. No.: 11/764,465

(22) Filed: Jun. 18, 2007

(65) Prior Publication Data

US 2008/0312836 A1    Dec. 18, 2008

(51) Int. Cl.
*G01W 1/00* (2006.01)
(52) U.S. Cl. .................... 702/3; 702/2; 702/4; 702/5
(58) Field of Classification Search .......... 702/2–5, 702/32, 72, 92, 94–95, 99, 130, 150, 154–155, 702/159; 701/213–216
See application file for complete search history.

(56) References Cited

U.S. PATENT DOCUMENTS

| | | | | | |
|---|---|---|---|---|---|
| 4,093,918 | A | * | 6/1978 | Hitney | 702/2 |
| 4,990,922 | A | * | 2/1991 | Young et al. | 342/52 |
| 5,510,798 | A | * | 4/1996 | Bauer | 342/357.03 |
| 5,899,957 | A | * | 5/1999 | Loomis | 701/214 |
| 6,067,852 | A | * | 5/2000 | Alber et al. | 73/178 R |
| 6,720,916 | B2 | * | 4/2004 | Christensen et al. | 342/357.05 |
| 7,298,869 | B1 | * | 11/2007 | Abernathy | 382/108 |
| 2002/0130813 | A1 | * | 9/2002 | Neira et al. | 342/462 |
| 2007/0027624 | A1 | * | 2/2007 | Powe et al. | 701/213 |
| 2007/0276598 | A1 | * | 11/2007 | Tillotson | 701/213 |

FOREIGN PATENT DOCUMENTS

EP    1262792    12/2002

OTHER PUBLICATIONS

Ware, Randolph H., et al. "SuomiNet: A Real-Time National GPS Network for Atmospheric Research and Education", Bulletin of the American Meteorological Society, vol. 81, 2000.

(Continued)

*Primary Examiner*—Eliseo Ramos Feliciano
*Assistant Examiner*—Mi'schita' Henson
(74) *Attorney, Agent, or Firm*—Harness, Dickey & Pierce, P.L.C.

(57) ABSTRACT

A system and method for obtaining weather related information for a portion of the Earth's atmosphere between a predetermined surface portion of the Earth and an airborne object located over the predetermined surface portion, and operating at a known altitude, using position locating signals from a space vehicle. In one exemplary implementation the space vehicle transmits a first position locating signal. The first position locating signal is received by the airborne object directly from the space vehicle. A second position locating signal from the space vehicle is received by the airborne object after being reflected from the predetermined surface portion at a known angle. Phase information from the first and second position locating signals is used to determine a refractivity of the atmosphere between the predetermined surface portion and the airborne object. The refractivity is used to determine weather related information for the atmosphere.

21 Claims, 3 Drawing Sheets

OTHER PUBLICATIONS

Coster, A. J., et al. "The Westford Water Vapor Experiment: Use of GPS to Determine Total Precipitable Water Vapor", ION 52nd Annual Meeting, Cambridge, MA Jun. 19-21, 1996.

Thompson, D. R., et al. "Surface Roughness Estimation from GPS Sea Reflections", NASA Earth Science Enterprise, IEEE Geoscience and Remote Sensing Symposium, 2002, p. 1278-1280.

Thayer, Gordon D. "An Improved Equation for the Radio Refractive Index of Air", Radio Science, vol. 9, No. 10, Oct. 1974, p. 803-807.

Aoyama, Yuichi, et al. "Mountaintop GPS Observations: Downward Looking GPS Occultation Measurement on the Top of Mt. Fuji", ION GNSS 2005, Long Beach, CA, Sep. 2005, p. 290-297.

Yoshihara, Takayuki, et al. "Measurement System and Experimental Results of Airborne-based Downward-looking GPS Occultation", research supported by Japan Ministry of Education, Culture, Sports, Science and Technology.

Lesne, O., et al. "Sensitivity Analysis for Airborne Sounding of the Troposphere by GNSS Radio Occultation", Physics and Chemistry of the Earth 27, 2002, p. 291-299.

\* cited by examiner

METHOD AND SYSTEM FOR DETERMINING WATER VAPOR PROFILE USING GPS SIGNALS

FIELD

The present disclosure relates to remote measurement, and more particularly to remotely measuring atmospheric variables used for weather prediction.

BACKGROUND

Previous systems used for obtaining atmospheric information used to predict weather patterns have involved using Global Positioning System satellite (GPS) signals to perform GPS occultation. GPS occultation involves measurement of a GPS signal's phase shift due to travel through the atmosphere to calculate the refractivity of a column of the atmosphere. The refractivity can then be used to deduce water vapor content, and more particularly the precipitable water vapor (PWV) in a designated area.

GPS and related constellations like Glonass and Galileo (often identified collectively as "Global Navigation Satellite Systems, or GNNS") use frequencies that are insensitive to atmospheric effects. Therefore, very sensitive occultation receivers are needed to measure the slight changes in refractivity due to natural variation in the atmosphere. These measurements are especially challenging from mobile platforms such as aircraft because small motions of the aircraft can change the phase of arriving GPS signals. Also, attempts to use aircraft have proven less than satisfactory for this purpose because measurements from an aircraft have only been able to provide refractivity data within an approximate 150 m by 150 km corridor. This area is too long to be easily used in computational models that provide PWV data.

Another aspect of the problem is the sparse coverage afforded by GPS occultation. Occultation measurements require that a GPS satellite appear within a few angular degrees of the observer's horizon. If the satellite is too low, it is occluded by the Earth. If it is too high, the signal's path through the atmosphere does not traverse the troposphere on its way to an aircraft flying at a typical cruise altitude (typically 30,000-40,000 ft, or 9100 m-12,133 m). This makes the data nearly useless for weather prediction. The times when a GPS satellite is near the horizon for a given aircraft are infrequent-typically once an hour or so. Given that a jet aircraft typically covers about 1000 kilometers in an hour (when operating at a cruise speed), the distance between occultation measurements is so large that the measurements give relatively little value for weather models.

With GPS, the primary function is to let GPS receivers compute their positions based on relative phase shift among GPS signals transmitted from several GPS satellites. Therefore, current approaches to measuring atmosphere properties rely on measuring the GPS phase shift. For weather estimation, prior art methods measure the excess phase shift induced by GPS signals following a bent (refracted) path through the atmosphere to the receiver. As the GPS satellite rises or sets, the path length through the atmosphere changes. The phase shift changes with the path length and the refractivity. Phase measurements taken along various lines of sight are fed to tomography algorithms that estimate the best-fit refractivity as a function of altitude, which is termed a "refractivity profile." This method can result in poor vertical or horizontal resolution. This is because each phase measurement is the sum of all phase shifts occurring anywhere along the signal's long path through the atmosphere. For example, using receivers aboard the COSMIC constellation of Low Earth orbit (LEO) satellites for this measurement can produce poor lateral resolution.

Networks of GPS receivers on land currently exist. There are currently two large scale GPS networks in the United States designed for real-time sensing of atmospheric water vapor: the NSF-UCAR SuomiNet, and the NOAA-FSL GPS-MET network. SuomiNet is designed primarily for university-based research and education while the FSL network is designed primarily for operational demonstration. SuomiNet is an international network, configured and managed to generate near real-time estimates of precipitable water vapor in the atmosphere, total electron content in the ionosphere, and other meteorological and geodetic information.

Many, if not most, conventional methods measure the phase shift directly and require precise knowledge of the receiving antenna's location. Meeting these requirements can be especially difficult on a moving platform like a high speed jet aircraft.

Other methods for gathering water vapor data over the oceans have been explored, however, they all have significant limitations. Radiosondes may be sent out over an ocean, but these can be expensive to gather the frequency of data required. Currently, the National Weather Service (NWS) obtains information on the water vapor distribution from satellite information and from twice daily radiosonde balloon launches at 93 sites around the continental United States. The radiosonde network is expensive to operate. In addition to the expense, the balloons carrying the sonde packages take about an hour to reach the tropopause. Therefore, the PWV data is not available for some time. Because there are not many radiosonde balloons available, the horizontal spatial density is too low and time between launches too high to observe rapid changes of the PWV with time and position. This is especially so over large bodies of the water such as oceans, where the PWV can vary significantly in short periods of time, giving rise to rapidly changing weather patterns.

Instrumentation on marine vessels such as ships does not provide sufficient frequency of PWV data to be useful for weather predicting purposes. In addition, ships are expensive to operate.

Land-based GPS receivers, the land-based receivers are unable to gather data for most of the Earth's surface, e.g., over the oceans. Poor coverage over the oceans leads to unreliable weather forecasts for the western United States, western Europe, Australia, and occasionally Japan. Using airborne platforms would allow meteorologists to have more expansive coverage, but current methods suffer from problems of wide resolution and infrequent coverage that limit the usefulness of information gathered for refractivity determination, and for weather prediction purposes.

SUMMARY

In one aspect the present disclosure relates to a method for obtaining weather related information for a portion of the Earth's atmosphere between a predetermined surface portion of the Earth and an airborne object located over the predetermined surface portion, using position locating signals from a space vehicle. The method may comprise receiving a first position locating signal while at a known, predetermined elevation above said predetermined surface portion of the Earth, with the first position locating signal being received directly from the space vehicle. A second position locating signal is received while at the known, predetermined elevation, with the second position locating signal being reflected from the predetermined surface portion at a known angle.

Phase information pertaining to a phase of each of the first and second position locating signals is used to determine a refractivity of the atmosphere between the predetermined surface portion and the airborne object. The refractivity is used to determine weather related information for the atmosphere.

In another aspect the present disclosure relates to a method for determining a refractivity of a portion of the Earth's atmosphere above a body of water using signals from a Global Positioning System (GPS) space vehicle. The method may comprise receiving a first GPS signal at an airborne mobile platform that is operating at a known, predetermined altitude above the body of water, with the first GPS signal being received directly from the GPS system. A second GPS signal is received at said airborne mobile platform after the GPS signal is reflected from the body of water at a known angle. Phase information pertaining to the first and the second GPS signals is used to determine a difference in phase between the received first and second GPS signals. The phase difference is used to determine a refractivity of the atmosphere between the body of water and the airborne mobile platform. The refractivity is used to determine at least one of precipitable water vapor (PWV) and temperature of the atmosphere between the body of water and the airborne mobile platform.

In another aspect the present disclosure relates to a method for determining a refractivity of a portion of the Earth's atmosphere above a body of water using signals from a Global Positioning System (GPS) space vehicle. The method may comprise receiving a first GPS signal at an airborne mobile platform that is operating at a known, predetermined altitude above the body of water, with the first GPS signal being received directly from the GPS system. A second GPS signal is received at the airborne mobile platform after the second GPS signal is reflected from the body of water at a known angle. Phase information pertaining to the first and second GPS signals is used to determine a difference in phase between the received first and second GPS signals. The phase difference is used to determine a refractivity of the atmosphere between the body of water and the airborne mobile platform. The refractivity is used to determine at least one of precipitable water vapor (PWV) and temperature of the atmosphere between the body of water and the airborne mobile platform.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
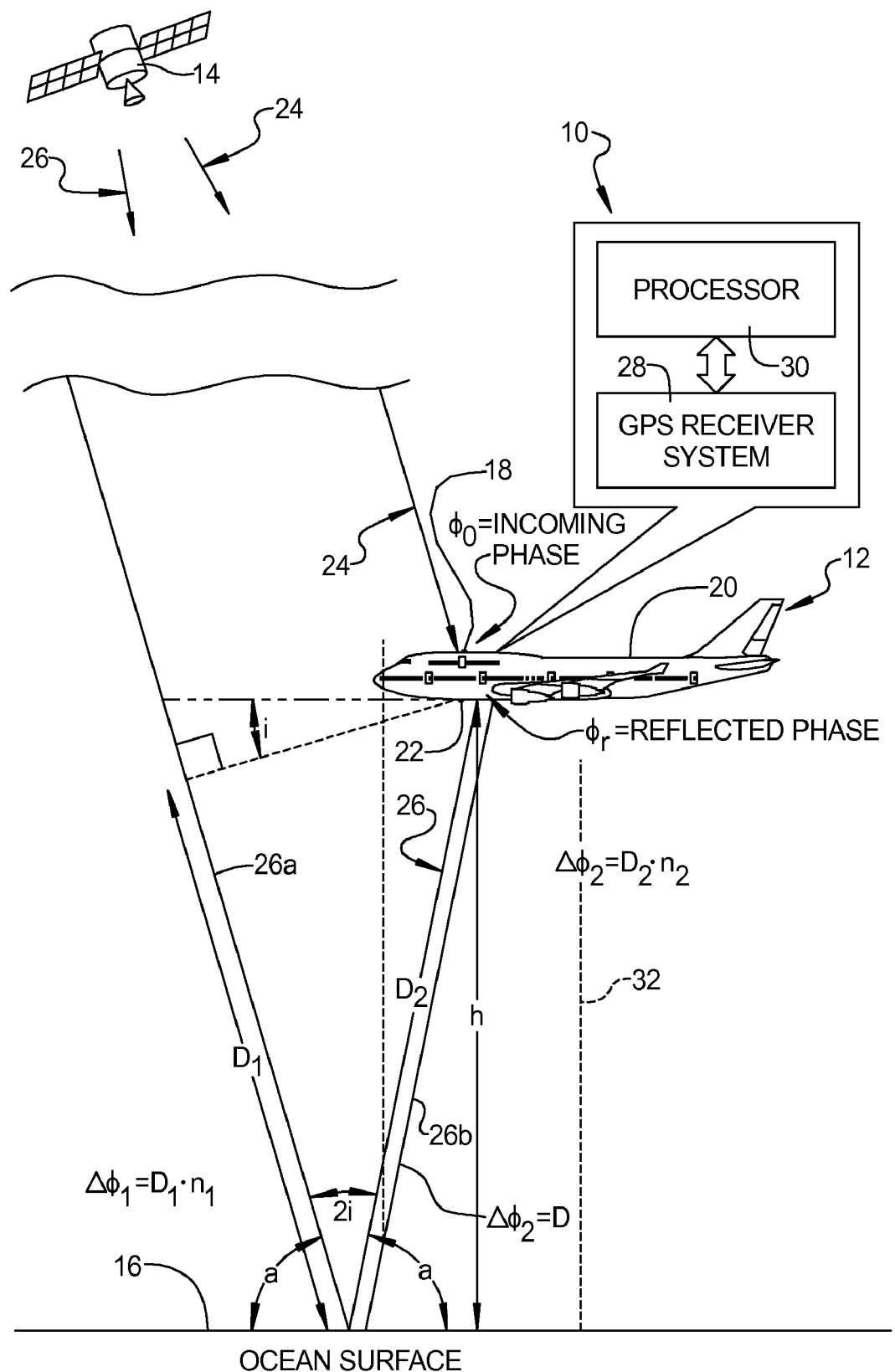
FIG. 1 is an illustration of a jet aircraft incorporating a system in accordance with one embodiment of the present application, with diagrams indicating the direct and reflected GPS signals received from a GPS space vehicle.

Referring to FIG. 1, there is shown a system 10 employed on an airborne mobile platform, in this example a high speed jet aircraft 12, for using signals from a GPS space vehicle (i.e., satellite) 14 to approximate the refractivity of the atmosphere. From the refractivity, the precipitable water vapor (PWV) in the atmosphere may be determined, as well the temperature. It will be appreciated, however, that while an aircraft 12 is illustrated as the airborne mobile platform, it is possible that other airborne vehicles, possibly unmanned airborne vehicles, rotorcraft or even balloons could potentially be used. Also, while explanation of the subject matter of the present disclosure will be made with reference to an "ocean", it will be appreciated the system 10 and the various methodologies for implementing it are equally applicable over smaller bodies of water, such as lakes or seas, as well as over land. However, the various embodiments and methodologies of the present disclosure are expected to find particular utility for providing highly useful weather prediction information over large bodies of water.

Referring further to FIG. 1, the aircraft 12 is operating at a known altitude (based on on-board navigation equipment) above an ocean 16. The aircraft 12 includes a first antenna 18 mounted on a crown, or adjacent a crown, of the fuselage 20 of the aircraft. A second antenna 22 is mounted at or adjacent to an undersurface of the fuselage 20. The first antenna 18 is used to receive GPS signals 24 directly from the GPS satellite 14 while the second antenna 22 receives GPS signals 26 reflected from the surface 16a of the ocean 16.

The system 10 includes a GPS receiver system 28 in communication with a processor 30. The GPS receiver system 28 is also in communication with both antennas 18 and 22. In general operation, the GPS receiver system 28 receives the direct and reflected GPS signals 24,26 and outputs the signals to the processor 30. Using the direct and reflected GPS signals 24,26, the processor 30 determines phase difference information between the signals. The determined phase difference information is used by the processor 30 to determine an average refractivity of the air (i.e., atmosphere) between the aircraft 12 and the ocean surface 16a. From the determined refractivity, and using additional algorithms to be described in the following paragraphs, the processor 30 is able to determine the PWV for a column 32 of the atmosphere between the ocean surface 16a and the aircraft 12.

Specific GPS frequencies that may be used with the present system 10 are both the L1 and the L2 frequencies. The L1 carrier is 1575.42 MHz and carries both the status message and a pseudo-random code for timing. The L2 carrier is 1227.60 MHz and is used for the more precise military pseudo-random code.

In FIG. 1, the reflected phase, $\phi_r$, is equal to:

$$\Phi_r = \Phi_0 + \Delta\Phi_1 + \Delta\Phi_2 \quad \text{Equation 1}$$

where $\phi_0$=phase of incoming GPS signal 24 being directly received by the aircraft 12; (Equation 1a)

where $\Delta\Phi_1 = D_1 * n_1$ =change in phase of the incoming GPS signal 26a along distance $D_1$; (Equation 1b); and where $\Delta\Phi_2 = D_2 * n_2$ =change in phase of the incoming GPS signal portion 26b along distance $D_2$.

In this case, the phase has units of radians. This can be interpreted as an optical path along a physical distance, for example the physical distance separating the GPS satellite 14 and the aircraft 12. The number of wavelengths within this distance varies when the index of refraction, "n", varies. As n increases, the number of wavelengths that can fit within this distance increases without changing frequency. Thus, the measurement is an effective phase shift which has units of radians as shown in Equation 2 below:

$$\phi = 2\pi L n / \lambda \quad \text{Equation 2}$$

For a ground-based receiver, the excess path length that the GPS signal must travel when the GPS satellite 14 is at its zenith relative to the receiver (due to changes in the index of refraction) is given by Equation 3, where refractivity, N(r), is related to the index of refraction n by $N=10^6(n-1)$. The limits of integration are expressed as $r_s$ and $r_a$ where, $r_s$ is the geodetic radius of the Earth's surface and $r_a$ is the geodetic radius of the top of the neutral atmosphere (i.e., the "neutral" atmosphere being the portion of the Earth's atmosphere below the ionosphere).

$$\Delta r = 10^{-6} \int_{r_s}^{r_a} N(r) dr \quad \text{Equation 3}$$

The term $\Delta r$ can be measured as GPS phase shift relative to the theoretical phase assumed if the Earth had no atmosphere. Equations for predicting $\Delta r$ when a GPS satellite is not at zenith are known in the art.

Some meteorologists use $\Delta r$ to help predict the weather using computer models. However, when h (aircraft 12 altitude) is approximately equal to $r_a$, not much is learned by meteorologists from $\Delta r$ looking upwards (above the aircraft 12). Therefore, it is necessary to consider the signal reflected from the ocean surface 16a.

An empirical formula can be used to calculate the refractivity of a parcel of air as shown in Equation 4. In this formula "T" is the temperature in Kelvin, "$p_d$" is the partial pressure of dry air, "$p_v$" is the partial pressure of water vapor, "$Z_d$" is the inverse compressibility factor for dry air and "$Z_w$" is the inverse compressibility factor for wet air. The constants "$k_1$", "$k_2$" and "$k_3$" are empirically determined.

$$N = k_1 \left(\frac{p_d}{T}\right) Z_d^{-1} + \left[k_2\left(\frac{p_v}{T}\right) + k_3\left(\frac{p_v}{T^2}\right)\right] Z_w^{-1} \quad \text{Equation 4}$$

This formula can also be expressed in Equation 5 below with the constants determined as:

$$(n-1) \times 10^6 = N = 77.6 (p_d/T) Z_d^{-1} + 64.8 (e/T) Z_w^{-1} + 3.776 \times 10^5 (e/T^2) Z_w^{-1} \quad \text{Equation 5}$$

An average PWV measurement can be calculated for the column of air below the altitude of the aircraft by determining $n_2$ (the average refractivity over the distance D2, discussed further below) from the phase shift difference between the two signals. With the quantity $n_2$, Equation 5 can be used, with tomographic algorithms, to determine the partial pressure of the water vapor, $p_v$.

The system 10 may also be able to determine the needed phase change between the two GPS signals 24,26 by measuring the Doppler shift between the two signals rather than the absolute phase difference. In this instance the angular velocity of the signals relative to the Earth would need to be different. The general results will be approximately the same, however, although the Doppler shift may be computationally easier to measure.

The total distance traveled by the incoming GPS signal 26 is represented by length 26a, between the GPS satellite 14 and the surface of the ocean 16, and by length 26b, which is the reflected portion between the ocean surface 16a and the aircraft 12. This total distance can be represented by the following equations, where $D_2$ (Equation 6a) represents length 26b and $D_1$ (Equation 6b) represents length 26a:

$$D_2 = \frac{h}{\sin \alpha} \quad \text{Equation 6a}$$

and $$D_1 = \frac{h \cos(2i)}{\sin \alpha} \quad \text{Equation 6b}$$

(2)

The reflected signal 26b will travel the additional distance $D_1$ and $D_2$ before being received by the antenna 22 on the bottom of the aircraft 12. The quantities $D_1$ and $D_2$ are known from the aircraft's 12 altitude and the GPS satellite 14 elevation angle relative to the aircraft. An average refractivity measurement can be calculated for the column of air 32 below the altitude of the aircraft 12 by determining $n_2$ from the phase shift difference between the two signals 24 and 26. The quantity $n_2$ is the average over the distance $D_2$ and $n_1$ is the average over the distance $D_1$.

Figure 2:
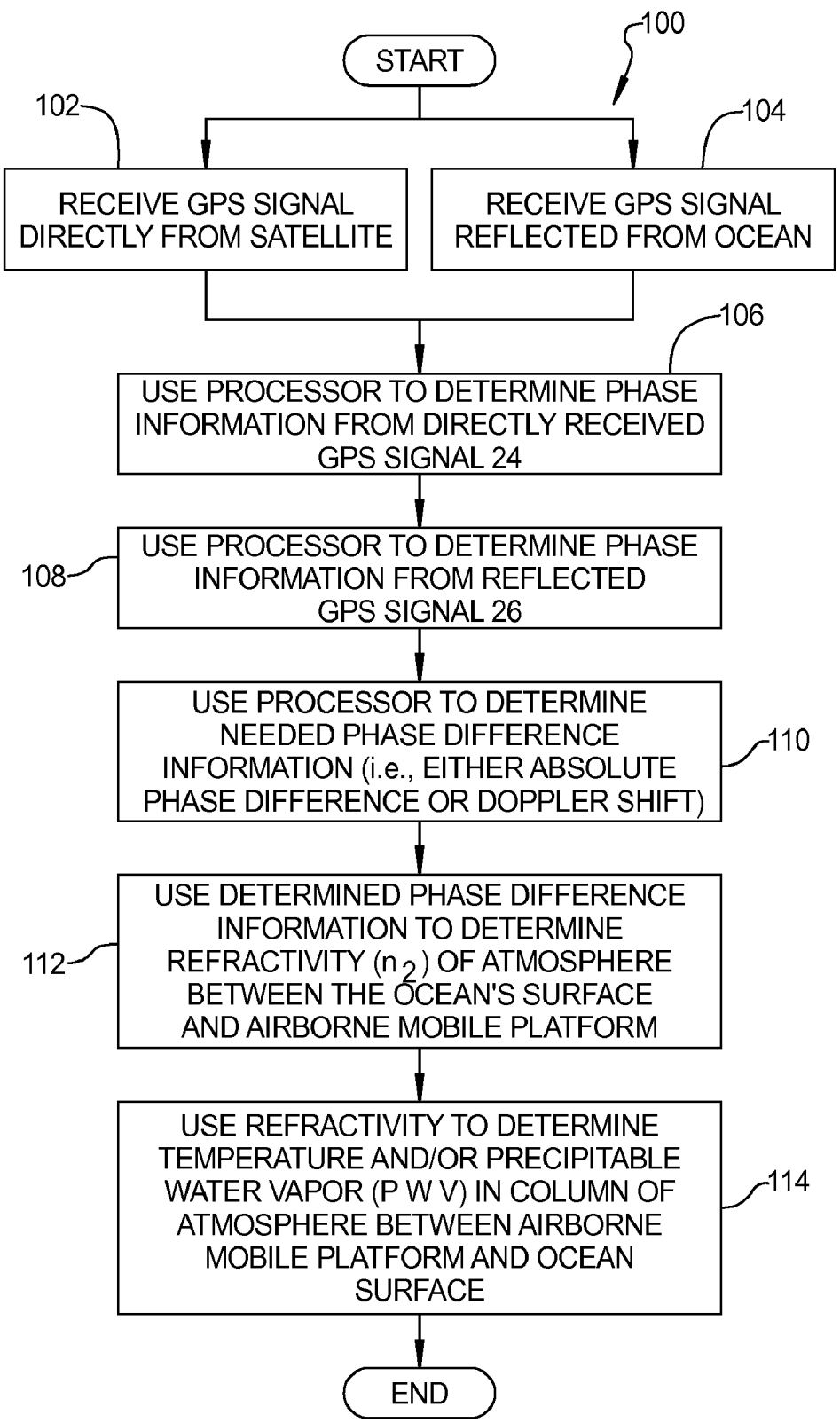
FIG. 2 is flowchart illustrating basic operations performed by a processor of the system of FIG. 1 in obtaining and analyzing the GPS signals to determine refractivity of a column of the atmosphere between the aircraft and ocean surface.

Referring to FIG. 2, a flowchart 100 is illustrated that summarizes the major operations described above. At operations 102 and 104, the GPS signals 24 and 26 are received by the GPS receiver system 28. At operation 106 the processor 30 uses the directly received GPS signal 24 to determine phase information associated with the signal 24. At operation 108 the processor similarly uses the reflected GPS signal 26 to determine phase information associated with the signal 26. At operation 110 the processor 30 uses the phase information obtained from GPS signals 24 and 26 to determine the needed phase difference information (i.e., either an absolute phase difference or a Doppler shift). At operation 112 the phase difference information is used to determine the refractivity ($n_2$) of the ocean surface 16a. At operation 114 the refractivity of the ocean surface 16a is used with a tomographic algorithm to determine the PWV of the column 32 between the ocean surface 16a and the aircraft 12.

The measurement of $n_2$ assumes the ocean surface 16a is a flat surface. This is often not the case, so in one embodiment the system 10 and methodology of the present disclosure may use a model for the reflection of electromagnetic radiation from waves on the ocean's surface 16a to obtain even more accurate phase information from the reflected GPS signal 26. This model corrects the apparent radius $r_s$ of the ocean surface 16a to account for waves. For example, researchers have developed a general bistatic scattering model that yields the cross section for the specular and resonant reflections of GPS signals from an ocean's surface. See, for example, Thompson, D. R. et. al., "Surface Roughness Estimation from GPS Sea Reflections," NASA Earth Science Enterprise, IEEE Geoscience and Remote Sensing Symposium, 2002, which is hereby incorporated by reference into the present application. The scattering model predicts the behavior of a GPS signal reflected from ocean waves, and particularly changes in $\phi_1$ and $\phi_2$ due to different reflective strengths of wave troughs and peaks.

Figure 3:
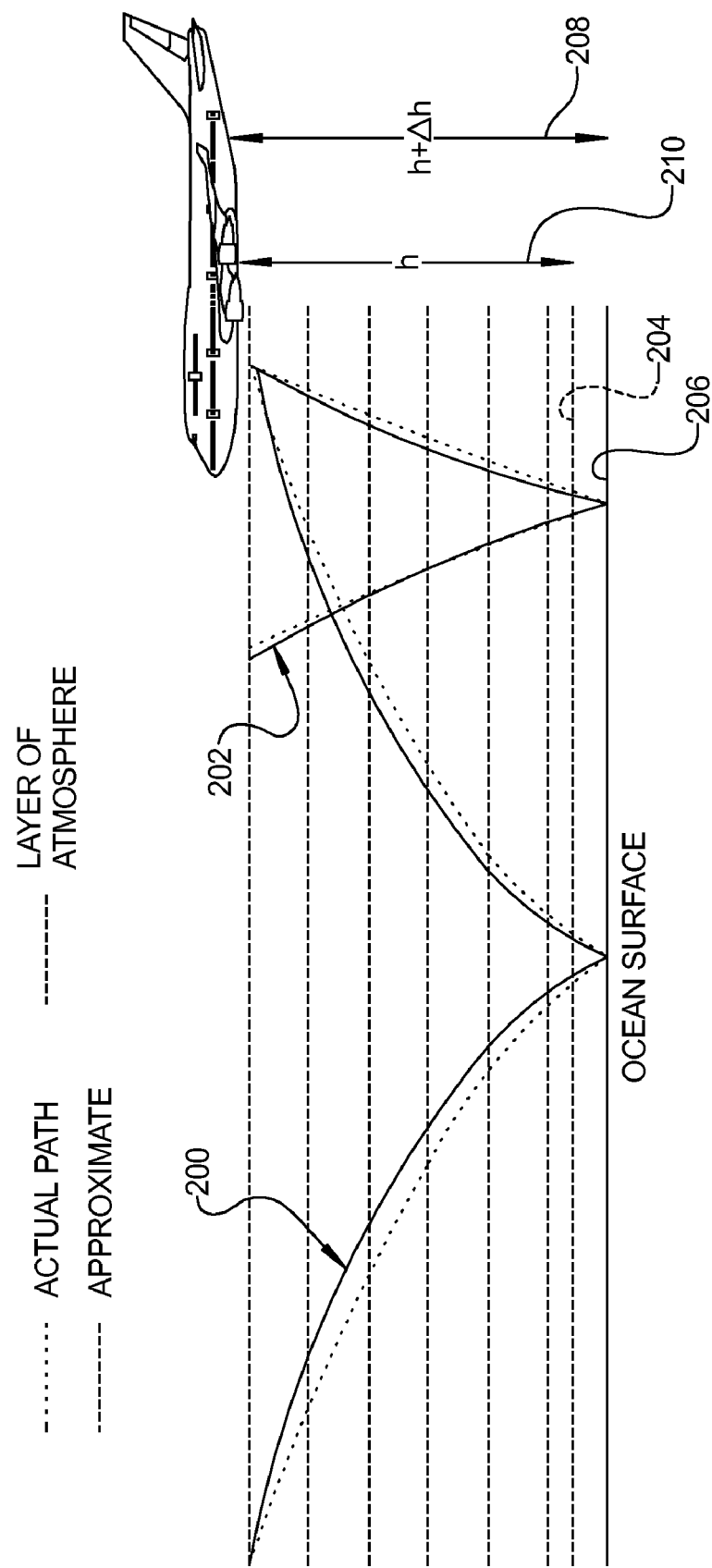
FIG. 3 is a simplified side diagrammatic view illustrating how two reflected GPS signals reflected at different angles to the aircraft can be used gauge and account for the effect of variations in ocean height that might affect the phase of the reflected signal being used for the refractivity determination.

Finally, the signal reflection measurement for the reflected GPS signal 26 may also benefit from corrections for sea level changes due to tidal variations and the local air pressure. It will be appreciated that high air pressure depresses the local ocean surface 16a. These corrections may be determined by comparing the phases of two separate incoming, reflected signals arriving at different angles from the vertical, e.g. signals from two GPS satellites. The signal at the lower angle gets refracted more for a given mean value of n, so it effectively travels a longer overall path to the aircraft 12. From two phase measurements at different elevation angles, values for the quantity h+Δh and the average refractivity, $n_2$, can be determined. This is explained with reference to FIG. 3. FIG. 3 shows a diagram of the nominal, approximate signal path compared to the actual path for two different incoming GPS signals 200 and 202, which impinge the ocean surface at two different elevation angles. In this example the changing level of the ocean surface is represented by reference numerals 204 and 206. The atmosphere may be modeled as several layers (represented by horizontal dashed lines in FIG. 3) where each layer has a different index of refraction (n). The first GPS signal 200 enters the atmosphere at a relatively low (grazing) elevation angle. The path from the second signal 202 is represented by the lines coming in at a more vertical angle. For the elevation angle of each incoming GPS signal 200 and 202, there is the actual path traveled by the signal and the approximate path (i.e. the path with a nominal refractivity profile). For signal 200 with the lower elevation angle, there is more error in the approximate path (denoted by dots) due to greater refraction through the various layers of the atmosphere. Signal 202, having a higher elevation angle, experiences less refraction (i.e., the dots denoting the approximate path are more closely in line with the actual path traveled by the signal). Therefore, the approximate signal is closer to the actual path. The altitudes from the ocean to the aircraft are h+Δh (denoted by reference numeral 206) and h (represented by reference numeral 208), respectively. Using the principles in FIG. 3, the system 10 and its methodology may find the average index of refraction n that gives the integrated phase shift shown in Equation 3.

The present system 10 provides a number of significant advantages of previous approaches to obtain atmospheric information for weather prediction purposes. For one, the ionosphere has a strong effect on radio signals, which adds to the phase shift of GPS signals. In previous systems, this complicates the approach to measuring phase shift and refraction in the neutral atmosphere because the phase shift due to the ionosphere must be subtracted from the total observed phase shift to obtain the phase shift due to neutral atmosphere. This can introduce uncertainty in estimates of temperature and water content in the neutral atmosphere. The system 10 avoids this problem. The signal arriving directly from the satellite (signal component 24) and the signal reflected from the ocean surface 16a (signal component 26) have both traversed the ionosphere and have therefore incurred the same phase shift (to within the limits of local isotropy in the ionosphere). This greatly reduces the effect of ionospheric delay, thereby simplifying the calculation of temperature and water content in the neutral atmosphere.

Previously developed systems have also used absolute phase measurements to determine phase shift in the atmosphere. Thus, with previously developed systems it was necessary to use GPS-like satellites where absolute phase information is encoded in the signal. In the present system 10, only the relative phase of the direct signal and the reflected signal needs to be measured. Therefore, the system 10 is not constrained to use GPS-like satellites. Rather, temporal correlation can be used to measure the phase shift between the direct signal and the reflected signal for any satellite with a non-repeating signal and known orbital parameters. As an example, the present system 10 can be used with Iridium satellites. Iridium satellites are more numerous than GPS satellites, which provides better observing opportunities and thereby improves the spatial and temporal resolution of atmosphere models used for weather prediction. Iridium satellites also provide a signal that is roughly 1000 times stronger signal than a GPS signal, which greatly improves the signal-to-noise ratio of the received signal at the present system 10 and thereby improves the accuracy of temperature and humidity measurements obtained with the present system 10. Other candidates that may be suitable for use with the system 10 include direct-broadcast TV satellites.

The present system 10 can also minimize horizontal drift of the measurement point during each set of measurements. Conventional airborne GNSS occultation requires observing a single GNSS satellite as it moves through several degrees of elevation near the horizon. It is known that such a measurement point can drift by as much as 450 km during one occultation. This drift (through potentially different weather conditions) is the major source of error for standard GNSS occultation. Because the system 10 can observe at two or more elevation angles concurrently (using multiple satellites), this source of error can be avoided.

The present system 10 can also use another aircraft, rather than a satellite, to produce the direct and reflected signal. While such an arrangement would probably not be highly preferred for routine meteorology operations, it nevertheless could be used for targeted measurements. Such targeted measurements could be used, for example, in applications involving high-resolution study of moisture profiles in air feeding a hurricane near the U.S. coast.

The system and methodology described herein thus enables temperature and precipitable water vapor to be determined through the use of an airborne mobile platform. This enables highly useful precipitable water vapor information to be obtained over oceans and other large bodies of water where weather fronts often develop.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for obtaining weather related information for a portion of the Earth's atmosphere between a predetermined surface portion of the Earth and a moving airborne object located over the predetermined surface portion, using a position locating signal from a space vehicle, the method comprising:

receiving a first position locating signal at the moving airborne object while at a known, predetermined elevation above said predetermined surface portion of the Earth, said first position locating signal being received by the moving airborne object directly from said space vehicle;

receiving a second position locating signal at the moving airborne object while at said known, predetermined elevation, said second position locating signal being reflected from said predetermined surface portion at a known angle before being received by the moving airborne object;

using phase information pertaining to a phase of each of said first and second position locating signals to determine a refractivity of said atmosphere between said predetermined surface portion and said moving airborne object; and using said refractivity to determine weather related information for said atmosphere.

2. The method of claim 1, wherein using said refractivity to determine weather related information comprises using said refractivity to determine temperature information.

3. The method of claim 1, wherein using said refractivity to determine weather related information comprises using said refractivity to determine precipitable water vapor (PWV) in said atmosphere.

4. The method of claim 1, wherein receiving said first position locating signal and receiving said second position locating signal comprises receiving said position locating signals at an aircraft operating at said predetermined altitude above said surface of the Earth.

5. The method of claim 4, wherein receiving said position locating signals at an aircraft comprises:
receiving said first position locating signal at a first antenna of said aircraft that is located adjacent a crown of a fuselage of said aircraft; and
receiving said second position locating signal at a second antenna of said aircraft that is located adjacent an underbody portion of said fuselage of said aircraft.

6. The method of claim 1, wherein using said phase information comprises:
determining a phase of said received first position locating signal;
determining a phase of said received second position locating signal;
determining an absolute phase difference between said first and second position locating signals; and
using said phase difference to determine said refractivity.

7. The method of claim 1, wherein using said phase information comprises:
using said phase information to determine a Doppler shift between said first and second position locating signals; and
using said Doppler shift to determine said refractivity.

8. The method of claim 1, wherein receiving said second position locating signal after said second position locating signal has been reflected from the surface of the Earth comprises receiving said second position locating signal after said second position locating signal has been reflected from a body of water.

9. The method of claim 8, further comprising considering waves existing in the body of water in determining a phase of said second position locating signal, and using said phase of said second position locating signal to assist in determining said refractivity.

10. The method of claim 8, further comprising receiving an additional position locating signal at the moving airborne object while the airborne object is at a known, predetermined elevation above the body of water and
said additional positional locating signal being reflected from said body of water at a different angle than said second position locating signal, and using said first and second position locating signals and said additional position locating signal to account for changes in a level of said body of water.

11. A method for determining a refractivity of a portion of the Earth's atmosphere above a body of water using signals from a Global Positioning System (GPS) space vehicle, the method comprising:

receiving a first GPS signal at an airborne mobile platform that is operating at a known, predetermined altitude above the body of water, said first GPS signal being received directly from said GPS system;

receiving a second GPS signal at said airborne mobile platform after second portion of said GPS signal is reflected from said body of water at a known angle;

using phase information pertaining to said first and second GPS signals to determine a difference in phase between said received first and second GPS signals;

using said phase difference to determine a refractivity of said atmosphere between said body of water and said airborne mobile platform; and using said refractivity to determine at least one of precipitable water vapor (PWV) and temperature of said atmosphere between said body of water and said airborne mobile platform.

12. The method of claim 11, wherein using said phase difference comprises:
using said phase difference to determine a Doppler shift between said first and second GPS signals; and
using said Doppler shift to determine said refractivity.

13. The method of claim 11, further comprising considering an effect of waves existing in said body of water when determining said phase difference.

14. The method of claim 11, further comprising using additional position locating signals from a different space vehicle, or from the same space vehicle when it has moved to a different elevation angle,
receiving a first one of the additional position locating signals at the moving airborne object while at a known, predetermined elevation above a second predetermined surface portion of the Earth, said first one of the additional position locating signals being received by the moving airborne object directly from said space vehicle;
receiving a second one of the additional position locating signals at the moving airborne object while at said known, predetermined elevation, said second one of the additional position locating signals being reflected from said second predetermined surface portion at a different angle than said second position locating signal, and using said second position locating signal and said second one of said additional position locating signal to account for changes in a level of said body of water.

15. The method of claim 11, wherein the operation of using phase information comprises considering an altitude of said mobile platform and an elevation of said GPS satellite relative to said mobile platform in determining distances that said first and second GPS signals travel to said mobile platform.

16. A system for determining weather related information using position locating signals from a space vehicle, the system comprising:

a moving airborne mobile platform having at least one antenna;

a receiver system in communication with said antenna, that receives:
a first position locating signal, while said mobile platform is operating at a known, predetermined elevation above a surface of the Earth, said first position locating signal being received directly from said space vehicle; and
a second position locating signal while operating at said known, predetermined elevation, said second position locating signal being reflected from said surface of the Earth at a known angle before being received by said receiver system;

a processor responsive to said position locating signals received by said antenna that determines phase information pertaining to said first and second position locating signals and uses said phase information to approximate a refractivity of a portion of the Earth's atmosphere between said surface and said airborne mobile platform, said refractivity useable for determining weather related information for said portion of the Earth's atmosphere between said surface and said airborne mobile platform.

17. The system of claim 16, wherein said weather related information comprises at least one of precipitable water vapor (PWV) and temperature.

18. The system of claim 16, wherein said processor uses said phase information to determine a phase difference between said first and second position locating signals.

19. The system claim 16, wherein said surface of the Earth comprises a body of water, and wherein said antenna receives said second position locating signal after said second position locating signal is reflected from said body of water.

20. The system of claim 16, wherein:

said antenna comprises first and second antennas;

said first antenna being located adjacent a crown of a fuselage of said airborne mobile platform and receiving only said first position locating signal; and said second antenna being located on an undersurface of said fuselage of said airborne mobile platform and receiving only said second position locating signal.

21. The system of claim 16, wherein said processor uses an altitude of said airborne mobile platform and an elevation angle of said space vehicle, relative to said airborne mobile platform, to assist in computing said phase difference.

* * * * *